Patented Sept. 30, 1924.

1,510,046

UNITED STATES PATENT OFFICE.

CLINTON E. DOLBEAR, OF SAN FRANCISCO, CALIFORNIA, ASSIGNOR TO INDUSTRIAL RESEARCH CO., OF SAN FRANCISCO, CALIFORNIA.

SEPARATION OF ALKALI-METAL SALTS.

No Drawing. Application filed August 12, 1923. Serial No. 658,186.

*To all whom it may concern:*

Be it known that I, CLINTON E. DOLBEAR, a citizen of the United States, residing at city and county of San Francisco and State of California, have invented certain new and useful Improvements in the Separation of Alkali-Metal Salts, of which the following is a specification.

My invention relates to the separation from each other and from their common solution of different alkali-metal salts. My method briefly stated comprises the addition of free ammonia to the solution.

Described more in detail, my method comprises the addition to the solution holding the different salts, of ammonia of such character and in such manner that it does not react chemically with these salts, but forces them to a greater or less extent out of the solution.

Different salts are differently affected by the presence of free ammonia in the solution. For example, the chlorides of alkali-metals are very little affected by the presence of even a large amount of ammonia, while the solubility of sulphates of these same alkali-metals are very greatly depressed by comparatively small amounts of ammonia, and sodium carbonate is rendered almost entirely insoluble in strong ammonia solutions.

I have also found that different alkali-metal salts of the same acid, and the same alkali-metal salts of different acids behave quite differently from each other with the same concentration of ammonia in their solutions. In other words, fractional separation of different salts can be effected by addition of increasing amounts of ammonia to solutions of such salts. To give concrete examples—If a mixture of sodium chloride, sodium sulphate and sodium carbonate in aqueous solution is subjected to addition of increasing amounts of ammonia, first sodium sulphate is quite completely precipitated. As the quantity of ammonia increases sodium carbonate begins to precipitate and finally is almost completely precipitated. Thus, by separating the precipitated sodium sulphate from the supernatent solution before the sodium carbonate precipitates, and then adding more ammonia until the sodium carbonate is precipitated, and separating this from the supernatent solution, separation of sodium sulphate, sodium carbonate and sodium chloride is effected, since the sodium chloride is not precipitated but remains in the solution.

Another example: If to a mixture of potassium and sodium nitrates in aqueous solution ammonia is added, the potassium nitrate is precipitated very completely, thus effecting the separation of potassium nitrate from sodium nitrate.

These examples might be carried out indefinitely, but these few will serve to illustrate the method and the principle involved.

I claim:

1. That step in the method of separating from each other different alkali-metal salts held in common in solution, which consists in adding ammonia to the solution to selectively precipitate them.

2. The method of separating from each other and from their common solution different alkali-metal salts, comprising the addition of ammonia to the solution to selectively precipitate them, and successively removing said precipitated salts.

3. That step in the method of separating from each other different alkali-metal salts held in common in solution, which consists in adding ammonia to the solution in increasing amounts to selectively, successively precipitate said salts.

4. The method of separating from each other and from their common solution different alkali-metal salts, comprising the addition to the solution of ammonia in increasing amounts to selectively, successively precipitate them, and successively removing said precipitated salts from the supernatent solution.

5. The method of separating from each other and from their common solution different alkali-metal salts, comprising the addition to the solution of ammonia to precipitate one of said salts; removing the precipitated salt; adding more ammonia to the solution to precipitate a second salt; removing said second precipitated salt; and so forth.

In testimony whereof I have signed my name to this specification.

CLINTON E. DOLBEAR.